Oct. 20, 1942.  J. A. MOREHEAD  2,299,488
MEANS FOR FORMING LENSES
Filed Dec. 21, 1938  2 Sheets-Sheet 1
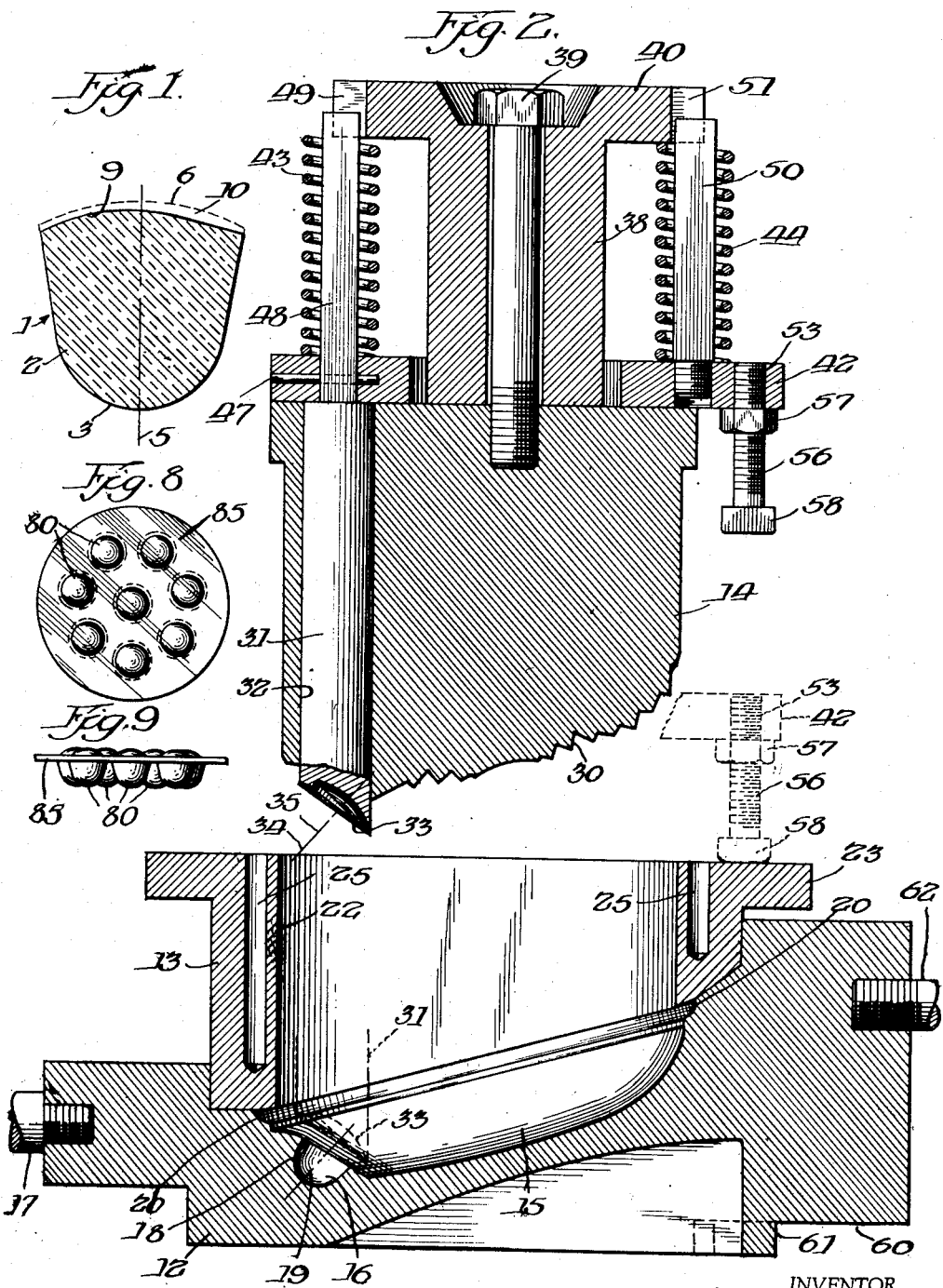
INVENTOR.
James A. Morehead
BY Morris Spector
ATTORNEY.

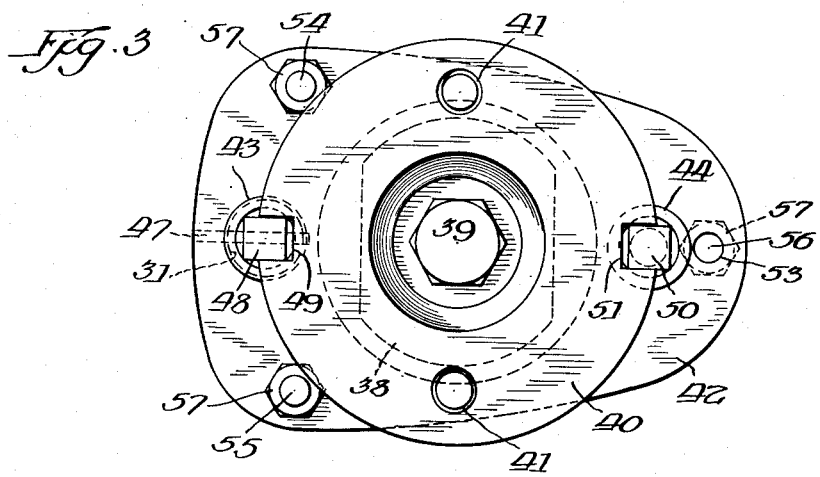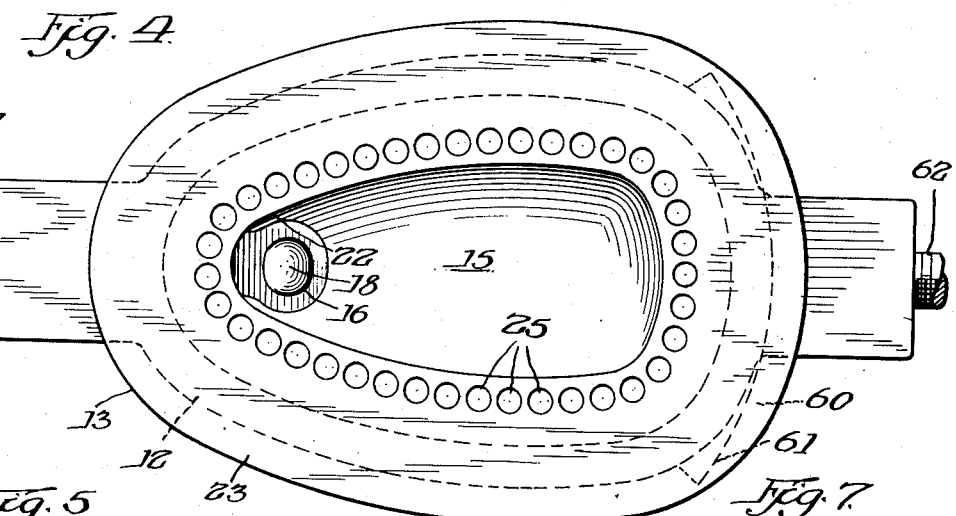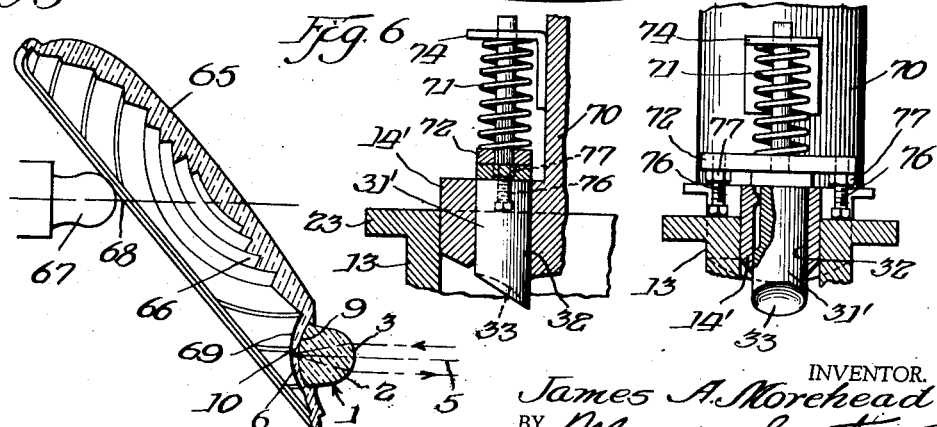

Patented Oct. 20, 1942

2,299,488

UNITED STATES PATENT OFFICE 2,299,488

MEANS FOR FORMING LENSES

James A. Morehead, Huntington, W. Va., assignor to Samuel M. Dover, Chicago, Ill.

Application December 21, 1938, Serial No. 247,083

4 Claims. (Cl. 49—72)

This application is a continuation in part of my application Serial No. 235,685.

This invention relates to apparatus and means for forming articles of glass or the like, particularly lenses. In its more specific aspects the present invention is concerned with means for forming a lens the opposite faces of which must be exactly of a prescribed shape and distance apart in order that the desired results may be obtained. It is an object of the present invention to provide a method and means for making such a lens at a low cost.

In my application above referred to I describe an automobile tail lamp lens comprising a main body of red glass particularly adapted for light transmitting purposes and of such configuration that the light from the electric bulb within the lamp will be directed through the lens in its proper direction. A portion of the complete lens is so constructed as to be particularly adapted for light reflecting purposes, rather than light transmitting purposes. That portion is shaped to reflect light from the head lamps of an approaching automobile back in the form of a beam almost parallel to the incident beam and with only a slight spread whereby the reflected light will be visible to the eye of the approaching motorist. In the preferred embodiment of this invention this is accomplished by a reflector of the type disclosed in the patent to Chretien, Reissue No. 19,070. It consists generally of a body or button of light transmitting material the opposite faces of which are spherical and preferably of different radii but having their centers on the same optical axis. The light must be reflected very nearly parallel to the incident beam, and with such a small degree of deviation that at a distance of three hundred feet the deviation is only slightly in excess of the amount required to bring the reflected beam of light into the line of vision of the driver of the approaching automobile. To accomplish this it is essential that the curvatures of the opposite surfaces of the button, and the distance between the surfaces, be very accurately determined. In the making of a cast or pressed glass button in large quantities it is almost impossible to maintain an exact curvature on the opposite surfaces of the button and an exactly predetermined spacing between the surfaces. This may be due, at least in part, to the fact that upon cooling, the body of plastic glass in the mold shrinks away from the plunger even before the glass has solidified, so that the shape of the top surface of the molten mass of glass is not positively controlled. The amount of shrinkage of the glass is a function of the kind of glass involved and of the quantity of glass.

In my above referred to application the reflector button is made with one surface of exactly the requisite shape and the opposite surface of almost but not necessarily quite the requisite shape, the deviation being such that the approximately formed surface must be built up to the requisite shape rather than reduced to the requisite shape. A layer or film of glass is then pressed to the requisite shape over the approximately correct surface. Any shrinkage of this layer of glass will necessarily be quite small because the layer itself is quite thin. The operation of forming the above mentioned layer upon the approximately formed curved surface may be performed simultaneously with the operation of molding the main body of glass of the tail lamp around the button. The present application is concerned with the method of and the dies for pressing the film or layer of glass over the insert button and pressing the main body of glass around the insert button.

It is one of the objects of the present invention to provide a method and means for forming such a lens wherein the mass of glass being molded around and over the insert button may be of approximately but not necessarily exactly the requisite volume and yet the thickness and curvature of the light reflecting portion of the lens will be exactly as required.

It is a further object of the present invention to provide a die or plunger for forming a lens of the above mentioned character, which die or plunger is so constructed that the portion thereof relied upon to form the autocollimating reflector may be removed and replaced without affecting the rest of the plunger.

It is a still further object of the present invention to provide a die or plunger for use in making lenses of the above mentioned character, which is so constructed and arranged that the thickness of the autocollimating reflector, or the position of one of the reflecting surfaces thereof, may be adjusted at will with a high degree of precision without affecting the construction or thickness of the rest of the pressed body of glass.

The attainment of the above and further objects of the present invention will be apparent from the following specification taken in conjunction with the accompanying drawings forming a part thereof.

In the drawings:

Figure 1 is a sectional view of a reflector insert to be molded into an automobile tail lamp lens;

Figure 2 is a longitudinal sectional view through a die embodying the present invention;

Figure 3 is a plan view of the die of Figure 2;

Figure 4 is a top view of the ring and mold of the die of Figure 2;

Figure 5 is a sectional view through a lens formed by the die of Figure 2;

Figures 6 and 7 are fragmentary sectional views at right angles to one another of another die;

Figures 8 and 9 are plan and side views of another pressed glass object made in accordance with this invention.

In the accompanying specification I speak of the lens as being made of glass. The substance "glass" is chosen for illustrative purposes only and it is to be understood that this term is being used in its broadest sense to include any plastic or moldable light transmitting material.

In the construction of autocollimating reflector buttons such as are shown, for instance, in Figure 3 of the patent to Chretien, Reissue No. 91,070, or as shown in my pending application Serial No. 235,685, it is essential that opposite curved surfaces of the reflector should be of exactly the requisite radius of curvature and the requisite distance apart. Consider, by way of example, an autocollimating reflector button a cross section of which is shown in Figure 1. The reflector button 1 consists of a body of glass 2 circular in cross section throughout. This button must be so constructed that it will reflect light in the form of a beam substantially parallel to an incident beam from varying angles, but with a very slight spread. For this purpose it is essential that the spherical surface 3 should have its center along the optical axis 5 and that the opposite spherical surface, indicated by the dotted line 6, should also have its center on the same optical axis 5 but be of a different radius than that of the surface 3. It is essential that the distance between the surfaces 3 and 6 should be a predetermined amount. In making this reflector by pressing molten glass between a pair of dies in a single operation it is exceedingly difficult to obtain the curvatures 3 and 6 exactly as required. To obviate this difficulty the reflector button 1 is therefore made so that the surface 3 is of the exactly required curvature and the top surface 9 is of approximately but not necessarily the requisite curvature. The button 1 may be made in any desired manner, as by molding or pressing, or in any other way. The space between the dotted line 6 and the full line 9 represents the extent to which the back surface 9 of the cast reflector button deviates from the ultimately requisite surface. In accordance with the teachings of the present invention a thin layer of glass 10 is then pressed over the surface 9 in such a way that the added glass 10 fuses with the body of glass 2 into one integral structure. Any shrinkage of the fused glass 10 may cause the surface 6 to deviate a slight amount from the surface of the die used in forming the surface 6 but, because the layer of glass 10 is very thin, from a few thousandths of an inch to a thickness of the order of a few tenths of an inch, the total shrinkage will necessarily be so very small as not to affect the accuracy of the ultimate lens. The body of glass 2 may be glass of one kind as, for instance, crystal clear glass, and the glass layer 10 may be of a different color as, for instance, amber or ruby colored glass, so that white light striking the surface 3 and passing through the reflector and then back out again at the surface 3 will be of the requisite color. After completion of the glass part of the lens the surface 6 is silvered to facilitate the reflection of light through the lens.

An explanation will now be given of the construction of the dies for forming a lens of which the precast button 1 is a part, the layer of glass 10 being formed on the precast button 1 during the process of forming of the rest of the lens. The die comprises a mold 12 adapted to receive a ring 13 and a plunger 14 mounted in a press (not shown) and arranged to be moved down into the ring 13 to press the lens to the requisite shape. The mold 12 is made of cast iron or the like and includes a cavity 15 having the shape of the exterior of the ultimately finished automobile lens to be made, and it also includes a cavity 16 of exactly the requisite shape to receive the reflector button 1 and hold the same snugly. A precast reflector button 1 can be placed in the cavity 16 with the surface 3 of the reflector button resting on the similarly curved surface 18 of the cavity 16, and the axis 19 of the cavity 16 coinciding exactly with the axis 5 of the button. It is to be noted that the cavity 15 in the mold 12 and the cavity 16 thereof are at such an angle to the horizontal that the ultimately cast lens is in a slightly inclined position in the mold. This facilitates the flow of the molten glass under the pressing action of the plunger or male die, as will be more fully described. The mold 12 has a handle 17 secured thereto to facilitate handling of the mold.

The mold cavity 15 includes a portion 20 adapted to form a peripherally extending rim around the lens.

The ring 13 fits snugly into the mold 12. A portion of the ring 13 overlies the rim forming space 20 so that the ring 13 prevents the plunger from drawing the cast lens up with it when the plunger recedes from the mold 12 at the completion of a pressing operation. The ring 13 has an opening 22 therein of exactly the same contour as that of the plunger 14 so that the plunger slides smoothly through the ring 13. The ring has a peripherally extending flange 23 to facilitate removal of the ring from the mold and reinsertion thereof into the mold. This flange 23 also has the additional function of acting as a stop for a part of the male die or plunger 14 as will be more fully set forth as this description proceeds. The ring 13 has a large number of small holes 25 formed therein around the opening 22 so that the thickness of metal from the surface 22 to the holes 25 is quite small. This reduces the heat storage capacity of the ring and inhibits the flow of heat from the surface 22 into the body of metal of the ring 13. The surface 22 therefore remains hotter than it would without the holes, and therefore has a lesser cooling effect on the glass.

The die or plunger 14 has a pressing face 30 shaped to form the interior of the lens to the requisite shape, illustrated more fully in Figure 5, and it also has an additional plunger 31 slidable in a bore 32 at one end of the plunger 14. The plunger 31 has a spherically curved surface 33 at its lower end, said surface having its center at 34 on the axis indicated by the line 35.

The plunger 14 is secured to a head 38 by a centrally located bolt 39 that threads into the body of the plunger 14. The head 38 has a flange 40 having a pair of threaded holes 41—41 for mounting the head on the vertically movable part of a glass press. A ring 42 embraces the head 38 and rests upon the top of the plunger 14, being pressed towards the top of the plunger 14 by two powerful springs 43—44 that bear at their lower ends against the ring 42 and at their upper ends against the peripherally extending flange 40 on the head 38. The plunger 31 is rigidly connected to the ring 42 in any desired manner, as by a pin 47 that extends through the ring and through an extension 48 which is an integral part of the plunger 31. The top of the extension 48 is guided in a slot 49 formed in the flange 40. A pin 50 is threaded at its lower end into the ring 42 and is embraced by the spring 44 and is guided at its upper end in a slot 51 in the flange 40.

The ring 42 has three similarly tapped holes 53, through which bolts 54, 55 and 56 are threaded, and locked in position by lock nuts 57 so that the heads 58 of all of the bolts are the same predetermined fixed distance from the ring 41. The lock nut 57 on the bolt 56 is below the ring 42 since this bolt is adjacent the pin 50. The lock nuts 57 for the bolts 54 and 55 may be on the top surface of the ring 42 since those holes are spaced from the portion 48 of the plunger 31, as may be seen from Figure 3.

An explanation will now be given of the manner of forming a lens in accordance with the present invention. A precast or pressed glass button 1, of the shape illustrated in Figure 1, and having a top curved surface 9 approximately but not exactly of the requisite curvature 6 is first formed. The surface 9 is at such a distance from the surface 3 that it has to be built up to the requisite surface 6 rather than be ground to the surface 6. The preformed glass button 1 is heated to a temperature below that at which softening of the glass takes place, but sufficiently high to permit fusion of the button with the rest of the lens to be formed and to avoid cracking or unduly straining the glass of the button or the glass to be formed adjacent thereto and fused thereto. The button 1 is then placed in the cavity 16 of the mold 12, with the surface 3 of the button lowermost. The mold may be and preferably is preheated, but this is not indispensable. Thereafter a mass of molten glass in an amount sufficient to form the lens is placed into the mold cavity 15. It is desirable that the elevated temperature of the button 2 be as low as possible but sufficiently high to avoid cracking as the mass of molten glass comes in contact therewith and upon the subsequent solidification and cooling of the molten mass. The ring 13 is then placed in the mold 12, in the position illustrated in Figure 2. The mold is then placed in the press. In order to center the mold in the press the bottom of the mold is recessed at 60 and is provided with a circular curved surface 61 which fits an oppositely curved or concave-faced plate in the press. A bolt 62 extending from the mold is brought against a stop in the press, thus definitely centering the mold in the press. The plunger 14 is then lowered, first into the ring and then into the mold 12. The plunger descends as a unit until the heads 58 of the bolts abut against the flange 23 of the ring 13, as indicated in dotted lines in Figure 2. When the plunger reaches this position the surface 33 of the plunger 31 is in the exact position for forming the surface 6 of the button. At that time the axis 35 of the spherical curve 33 coincides with the axis 19 of the spherical curve 18, and the curved surface 33 is at exactly the correct distance from the curved surface 18. This places the curved surface 33 at a very slight distance from the curved surface 9. This distance may be anywhere from a few hundredths of an inch to a few tenths of an inch. The molten glass on the surface 9 of the button 1 is thus pressed to the requisite shape by the plunger 31. It is, however, not indispensable that the molten glass be on the button 1 at the time the plunger 31 reaches its lowermost position, although that is the preferred condition. The press operator continues lowering the plunger 14, the plunger 31 at this time remaining stationary, until he feels the proper amount of back pressure resisting further downward movement of the plunger 14. The plunger 14 in its descent has pressed the mass of molten glass to the requisite shape and if there was no glass initially between the surface 33 of the plunger 31 and the surface 9 of the button 1 the further descent of the plunger 14 forces the molten glass into the space between the plunger 31 and the button 1. The glass is thus pressed into the requisite shape. In thus forming the lens it is not essential that the amount of molten metal placed in the mold should be determined with extreme precision. Any slightly greater or lesser amount of molten glass placed in the mold 15 will result in a slightly thicker or thinner lens body but can not affect the thickness of the button between the surface 3 and the surface 6. During the pressing of the glass the springs 43—44 exert sufficient pressure upon the plate 42 and thus upon the plunger 31 to prevent the pressure of the glass from forcing the plunger 31 upwardly.

The molten glass fuses with the precast glass button 1 to form one integral structure. The lens thus formed is illustrated in Figure 5. It comprises a body of red glass 65 having the clear glass insert 1 molded therein and united to the main body of red glass by the thin layer of glass 10. Fresnal rings 66 are formed in the glass body 65 so that light from an electric light bulb 67, which is located on the optical axis 68, will emanate from the lens 65 in a substantially horizontal direction. The axis 5 of the button 1 is horizontal when the lens is mounted in its normal position, as illustrated in Figure 5. A layer of silvering material 69 is formed on the back of the lens 65 at the insert 1 to reflect light forward of the lens of Figure 5. A ray of light striking the button 1 from any angle within prescribed limits will pass through the button, through the layer of glass 10, to the mirror reflecting surface 69. From the surface 69 the ray of light will be reflected back through the layer of glass 10 and the button 1 to emanate from the button in a direction substantially parallel to the incident beam but with a very slight spread. The light from the headlights of an approaching automobile will be reflected back by the reflecting surface 69 with sufficient spread to reach the eyes of the driver of the approaching automobile. The back of the mirror reflecting surface 69 may be coated with a paint, such as aluminum paint, or other preservative to protect the mirror reflecting surface.

The mold 15 is formed with the button receiving cavity 16 at a substantial angle to the vertical. This is due to the fact that the lens is adapted to be mounted at an angle to the vertical and it is necessary that the axis 5 of the button be horizontal. If the lens of Figure 5 were to be molded in such a position that the axis 19 of the cavity 16 is vertical then there would be considerable difficulty in pressing the glass upwardly from the lowermost part of the cavity. On the other hand, if the mold cavity 15 of the mold had been formed in a position rotated in a clockwise direction from that shown there would be difficulty in forming the Fresnel projection 66.

While I have here described a set of dies and a process for making a lens having a single reflecting button, it is to be understood that the principles of the present invention are applicable to the manufacture of a lens having a plurality of reflector buttons. In that case the mold 12 would have a plurality of cavities corresponding to 16, each for receiving a precast reflector button, and the plunger 14 would have a plurality of individually movable plungers 31, one for each reflector button. All the plungers 31 may be secured to the stop plate 42 or each plunger may be provided with an individual stop to limit its downward movement into the mold. Thereafter the continued downward movement of the plunger 14 presses the molten glass into the spaces between the precast buttons and the curved surfaces 33 of the respective plungers 31.

In Figures 6 and 7 I have shown a fragmentary portion of a male die or plunger of a construction somewhat different from that of Figure 1. In this construction the plunger 14', which corresponds to the plunger 14 of Figure 2, includes a cylindrical part 70 integral therewith for mounting the plunger in a glass press in the same manner as in Figure 2. The plunger 31', which corresponds to the plunger 31 of Figure 2, slides in the bore 32 of the plunger 14', being pressed downwardly by a very powerful spring 71 that bears at its lower end against a plate 72 that is secured to the plunger 31' and at its upper end against an L-shaped bracket 74 that is suitably secured to the cylindrical part 70 of the plunger 14'. The plate 72 has a pair of stop bolts 76—76 threaded therethrough and locked in position by lock nuts 77 so that the heads of the bolts 76 constitute adjustable stops in exactly the same manner as do the heads 58 of the nuts 54, 55 and 56 in the embodiment previously described. Upon descent of the plunger 14', and with it the plunger 31', into the ring 13 of the mold 12 of Figure 2, the heads of the bolts 76 ultimately engage the flange 23 of the ring and thus limit further descent of the plunger 31'. As the plunger 14' continues to descend, the plunger 31' remains stationary, the plunger 14' sliding on the plunger 31'. The plunger 14' presses the glass to the requisite shape while the plunger 31 forms the thin layer of glass 10 (Figs. 1 and 5) to exactly the requisite shape and at exactly the requisite distance from the surface 3 of the precast glass button 1. In other respects this die and the pressing operation are the same as in the embodiment previously described.

In Figures 8 and 9 I have shown, diagrammatically, a cast glass reflector having a plurality of buttons as an integral part thereof. The buttons are indicated by the reference numerals 80. This reflector unit may be formed by placing a plurality of buttons, in this instance eight, into suitably formed cavities in a mold and then placing a body of molten glass into the mold, in the manner above set forth and molding the thin surfacing layer 10 (Fig. 1) over the bodies by means of a plunger corresponding to the plunger 14, which plunger has eight movable plungers therein corresponding to the plunger 31. These eight movable plungers may have individual stops for fixing their lowermost position with respect to the female mold part, or the eight plungers may be locked together by a plate corresponding to the plate 42, which is in turn provided with stops for limiting the descent of the plate with respect to the mold. In this construction the button receiving cavities in the mold, corresponding to the cavities 16, are formed in the mold with their axes, corresponding to the axis 19 of Figure 2, vertical. The corresponding axes 35 of the respective plungers forming the layers 10 are therefore also vertical and in alignment with the axes of the button cavity in the female or mold part. When the molten glass is pressed around the buttons a body of glass 85, which is of the material of the glass 10, is formed which is fused to and connects the respective buttons. If it is desired to make the surface 9 approach more closely the requisite surface 6, the molded article may be left in the mold to solidify and partially cool and then an additional layer of molten glass may be pressed over the same. Thereafter the back surfaces 6 of the respective buttons may be silvered to facilitate light reflection.

The process outlined above for the manufacture of the reflector body of Figures 8 and 9 may be used for forming the buttons 1. In this process no precast buttons are placed into the button receiving cavities. Instead a mass of molten glass is placed in the mold and a plunger 14 with its individually movable plungers 31 is brought down upon the mass of molten glass. The quantity of glass placed in the mold is such that the overflow from the buttons, represented by the thickness of glass at 85, would be very small. The resulting product would be a series of buttons such as illustrated in Figure 1, joined by a thin fin of glass 85. The buttons may then be broken away from the fin to provide the individual buttons for use in the mold of Figure 2, or for such other use as may be desired.

From the above description it is apparent that the principles of the present invention may be applied to the manufacture of glassware wherever it is desired to make an article of pressed glass having a fixed and predetermined thickness at any determined place or places. If an article of that type is molded by a die such as is illustrated in Figure 2, with or without a precast insert, the body of glass opposite the movable plunger 31 will be of a thickness as desired even though a greater or lesser amount of molten glass may have been placed in the mold by the operator. If a slightly greater amount of glass is used the overflow material will result in a thicker body of pressed glass without increasing the thickness of the glass opposite the plunger 31. Likewise if a slightly lesser amount of glass is placed in the mold the resulting product will be somewhat thinner throughout, except at the place where the plunger 31 engages the body of glass. Furthermore, the main plunger 14 presses the molten glass into intimate engagement with the surface of the plunger 31 so that the surface of the glass at that place is of the shape exactly as determined by the shape of the plunger, allowing for deviations as the glass shrinks from the plunger upon cooling.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. Glass pressing apparatus comprising a mold, a mold ring fitting thereinto, and a plunger movable through the ring into the mold, said ring having a thin plunger receiving metallic wall, heat insulating means substantially surrounding the thin wall, and said ring including a metallic backing for said thin wall joined therewith through the heat insulating means.

2. Apparatus for molding a layer of glass on to one surface of a preformed glass insert, said apparatus including a mold having a portion thereof shaped to receive and hold the insert, a first plunger having a molding surface movable to a position opposite said insert receiving surface and spaced from the insert to leave a space for plastic glass to flow between the insert and the molding surface, positive stop means for fixing the position to which the plunger is movable, a second plunger movable into the mold and pressing plastic glass between the insert and the first plunger under pressure, said two plungers being one within the other and relatively movable, and means for maintaining the first mentioned plunger in a position determined by the stop means notwithstanding the pressure of the plastic glass urging it away from the stop means.

3. A mold for making a pressed glass article of the type wherein the thickness of a portion of the article must be controlled with a degree of accuracy substantially greater than the degree of accuracy required for the rest of the article, said mold comprising relatively movable molding members, one of the mold members having a portion of the interior surface thereto shaped to receive a preformed insert, the opposite member having a plunger movable therewith and also movable with respect thereto, said plunger having a molding surface movable into a position opposite to but spaced from the insert receiving surface, abutment means acting as a positive stop to limit the extent of movement of the plunger towards the opposite molding member as the members approach one another but before the limits of relative approach of the members is reached.

4. A mold for making a pressed glass article of the type wherein the thickness of a portion of the article must be controlled with a degree of accuracy substantially greater than the degree of accuracy required for the rest of the article, said mold comprising relatively movable molding members, one of the mold members having a portion of the interior surface thereof shaped to receive a preformed insert, the opposite member having a plunger movable therewith and also movable with respect thereto, said plunger having a molding surface movable into a position opposite to but spaced from the insert receiving surface, abutment means acting as a positive stop to limit the extent of movement of the plunger towards the opposite molding member as the members approach one another but before the limits of relative approach of the members is reached, and spring means urging the plunger towards the opposite molding member and towards the stop with a force substantially in excess of the force exerted thereagainst in the opposite direction by the pressure of the glass being pressed.

JAMES A. MOREHEAD.